(12) United States Patent
Apel et al.

(10) Patent No.: US 6,283,150 B2
(45) Date of Patent: Sep. 4, 2001

(54) HALL EFFECT ROTATION SENSOR FOR A THROTTLE VALVE UNIT

(75) Inventors: Peter Apel, Südkirchen; Klaus Wilczek, Werne, both of (DE)

(73) Assignee: AB Elektronik GmbH, Werne (DE)

( * ) Notice: Subject to any disclaimer, the term of this patent is extended or adjusted under 35 U.S.C. 154(b) by 0 days.

(21) Appl. No.: 09/758,922

(22) Filed: Jan. 19, 2001

Related U.S. Application Data

(62) Division of application No. 09/493,406, filed on Jan. 28, 2000.

(30) Foreign Application Priority Data

| Jan. 29, 1999 | (DE) | 199 03 490 |
| Jan. 29, 1999 | (DE) | 199 03 653 |
| Jan. 29, 1999 | (DE) | 299 01 516 |
| May 17, 1999 | (DE) | 299 08 409 |
| May 27, 1999 | (DE) | 299 09 201 |

(51) Int. Cl.⁷ ................................. G01B 7/14
(52) U.S. Cl. .............. 137/554; 251/129.11; 251/248; 324/207.2; 324/207.25
(58) Field of Search .............. 137/554; 251/129.11, 251/129.04, 248; 324/207.2, 207.25

(56) References Cited

U.S. PATENT DOCUMENTS

| 3,742,340 | * | 6/1973 | Kiedrowski | 340/199 |
| 5,025,213 | * | 6/1991 | Dobler et al. | 324/207.15 |
| 5,257,014 | * | 10/1993 | Zimmermann | 137/554 |
| 5,609,184 | * | 3/1997 | Apel et al. | 137/554 |
| 5,856,743 | * | 1/1999 | Juniman | 324/207.25 |

FOREIGN PATENT DOCUMENTS

| 19630764 | 4/1997 | (DE) . |
| 19634281 | 2/1998 | (DE) . |
| 69502512 | 1/1999 | (DE) . |
| WO 98/55828 | 12/1998 | (WO) . |

* cited by examiner

Primary Examiner—A. Michael Chambers
(74) Attorney, Agent, or Firm—Fulbright & Jaworski, LLP

(57) ABSTRACT

A Hall-effect angular rotation sensor device for a throttle valve unit. The sensor includes a housing unit, a stationary unit, and a moving unit moveable relative to the stationary unit. The stationary and the moving units are at least partially enclosed by the housing unit. The stationary unit includes a first and a second partial ring stator segment that are at least partially retained in the housing unit, leaving a stator distancing gap in which at least one Hall-effect IC switch is positioned. The moving unit includes (a) a partial ring magnet segment that is at least partially distanced from the first and the second partial ring stator segments by an air gap and (b) a third partial ring stator segment positioned behind and opposite the air gap.

10 Claims, 5 Drawing Sheets

HALL EFFECT ROTATION SENSOR FOR A THROTTLE VALVE UNIT

This is a divisional of co-pending application Ser. No. 09/493,406, filed Jan. 28, 2000, which claims priority to pending German patent application number 29909201.1 filed May 27, 1999, number 29908409.4 filed May 17, 1999, and numbers 19903490.7, 19903653.5, and 29901516.5 filed Jan. 29, 1999.

BACKGROUND OF THE INVENTION

1. Field of the Invention

The present invention relates generally to the field of position devices. More particularly, it concerns a position device for a throttle valve unit, in which a throttle valve held by a throttle valve shaft is arranged adjustably in a housing unit that includes at least one Hall-effect angular rotation sensor unit that is arranged on the throttle valve unit. The sensor unit includes a stationary unit, a moving unit that can be moved relative to the stationary unit, a drive unit, and a transmission that is arranged between the moving unit and the drive unit. The housing unit encloses, at least partially, the stationary unit and the moving unit. Even more particularly, the invention concerns a Hall-effect angular rotation sensor device that includes a stationary unit and a moving unit that can be moved relative to the stationary unit. The housing unit encloses, at least partially, the stationary unit and the moving unit.

The present invention also relates generally to the field of adjusting devices. More particularly, it concerns an adjusting device for a throttle valve unit with a throttle valve, which is adjustably contained with a throttle valve shaft in a throttle valve housing. That housing contains at least a Hall-effect angular rotation sensor unit that is coupled with the throttle valve unit including: a stationary unit, a mobile unit that can be moved in relation to the stationary unit, a drive unit, a transmission that is positioned between the mobile unit and the drive unit, and a housing element that encloses at least partially the stationary and the mobile units and the transmission.

2. Description of Related Art

An adjusting device of particular interest is described in WO 95 14 911 A1. It consists of a throttle valve that is enclosed by a throttle valve housing. The throttle valve with a throttle valve shaft is arranged rotatably in the throttle valve housing. An angular rotation sensor, a transmission unit, and a motor unit (that are connected to each other) are arranged in a sensor housing. A specially-configured housing for electronic components contains a circuit unit separately. The individual housings can be stacked together. The angular rotation sensor consists of a stationary element, relative to which a rotating element can be moved. The stationary element is a stator element consisting of two partial, half-moon shaped stator elements, between which there is a distancing gap in which a Hall sensor is located. The rotating element is a ring magnet element that is retained by a magnet retaining unit connected to a shaft.

Although this adjusting device has exhibited at least a degree of utility, its assembly expense may be very high. In addition, it is not possible to mount the angular rotation sensor, the motor, and the transmission easily on different types of throttle valve units.

In WO 98 55 828 A1 an angular rotation sensor is described in which stator elements and a magnet element are configured in the shape of partial ring segments. While this configuration reduces the quantity of material needed to produce these parts, manufacturing and assembly costs may be very high.

Accordingly, and in view of the shortcomings listed above, it would be advantageous to develop an adjusting device and an angular rotation sensor device that are easy to manufacture, easy to assemble, and easy to connect. This task is solved by a position device and by an angular rotation sensor device according to the present disclosure.

SUMMARY OF THE INVENTION

Certain advantages accomplished by the invention reside in that stator elements may be configured as partial ring stator segments, and a ring magnet element may be configured as a partial ring magnet segment. Such a design advantageously saves material. The integration of these parts into units of an angular rotation sensor makes subsequent adjustments unnecessary, saving valuable assembly time. The special configuration of the partial ring magnet segment and a three-piece division of the stator into three partial ring stator segments (and their special correlation with each other) constitutes an advantageous design of an angular rotation sensor. Such a design makes highly precise measurements possible.

In an angular rotation sensor device according to one embodiment of the present disclosure, the moving element may be a toothed gear segment of a transmission. This toothed gear segment may be mounted on a throttle valve shaft of a throttle valve. The movable element, however, may also be configured in a different way and may be part of another device (e.g., part of a belt tightener or the like). The variable configuration of the rotatable element makes it possible to combine it with a multitude of different systems used to measure an angle of rotation.

In one embodiment, the first and the second partial ring stator segments, as well as the partial ring magnet segment and the third partial ring stator segment, may be positioned in one plane at least partially side by side. In another embodiment, they may be positioned at least partially on top of each other. With the benefit of the present disclosure, it will be apparent to those having skill in the art that other configurations may also be utilized.

In one embodiment, when the toothed gear segment rotates from a zero position to an end position, the partial ring magnet segment and the third partial ring stator segment may assume a position relative to the first and the second partial ring stator segments in which they are positioned at least partially overlapping each other in a zero position and almost completely overlapping each other in an end position. With partial segments that lie in one plane, the partial ring magnet segment and the third partial ring stator segment move like a sickle past the first and second partial ring stator segments (that also act like a sickle), starting at the tips, and past each other either side by side or one underneath the other, until they reach the ends of the two sickles. In this embodiment, the Hall-effect IC switch is positioned at the most effective point of movement of these two sickle-shaped partial elements.

The first and the second partial ring stator segments, as well as the partial ring magnet segment and the third partial ring stator segment, feature sickles that are as long as a segment of a circle between about 80° and about 180°. In one embodiment, a circle segment of about 115° was found to be the variant that is optimum for measuring.

In one embodiment, the partial ring magnet segment may be configured as a magnet of opposite polarity. This reduces the total height of the angular rotation sensor device by about one-half. In one embodiment, the angular rotation sensor device with its parts and transmission may be enclosed, at least partially, by a sensor housing element of the housing unit. The toothed gear segment may be coupled in the sensor housing element to a spring element that is also contained in the sensor housing element. This guarantees a well-defined end position.

In order to be able to better adjust individual parts, plastic material may be used. If the sensor housing element is molded out of plastic material, the first and the second partial ring stator segments may be molded into it during the same molding process. When forming the toothed gear segment out of plastic material, the partial ring magnet segment and the third partial ring stator segment may be molded into the plastic material as well. Molding into plastic saves additional adjusting effort and facilitates the main assembly of the basic elements of the angular rotation sensor device.

In one embodiment, the throttle valve with the throttle valve shaft may be contained in a throttle valve housing of the housing unit. The sensor housing element may be placed on the throttle valve housing, and the toothed gear segment may be plugged onto the throttle valve shaft. Such a two-piece configuration makes it possible to manufacture an angular rotation sensor with a transmission, etc. at a different site than the site where the throttle valve unit is produced. The prefabricated units may then be assembled at the site of the throttle valve manufacturer or at a different site. In this fashion, it is possible to manufacture large quantities and to optimize the final unit cost.

In one embodiment, the sensor housing element may be configured as a housing cap. Such a housing cap element may be put on the throttle valve housing as a sealing element. In another embodiment, the sensor housing element itself may feature a cap that may be used to close it. In an embodiment in which the first and second partial stator ring elements are positioned on top of each other, those elements may also be molded into a cap, at least partially.

In one embodiment, the sensor housing element and the throttle valve housing may be coupled to each other. The coupling may be realized through any methodology known in the art including, but not limited to, screws, an additional bar, or the like.

In one embodiment, the first, second, and third partial ring stator segments may include a ferrous material. Select steels or any other suitable material may also be used. In this embodiment, the partial ring magnet segment and the third partial ring stator element may be shaped as a single piece. Subsequently, the partial ring magnet segment may be configured as a magnet of opposite polarity using magnetizing procedures as known in the art.

In one embodiment, the transmission may be configured conventionally or with magnetic gearing. The transmission may include the following components: a toothed gear segment, a motor bevel gear coupled to the drive unit, an intermediate bevel gear, and an adjusting bevel gear that may be coupled to the intermediate bevel gear and which may be held rotatably in the sensor housing element. The toothed gear segment may engage the adjusting bevel gear, and the motor bevel gear may engage the intermediate bevel gear.

In one embodiment, the drive unit may be a motor that is at least partially enclosed by the sensor housing element. However, it is also possible that the motor, which may be enclosed by an external housing, may be coupled to the cap housing element. In both embodiments, a configuration results that may be coupled in an easy manner to a separately manufactured throttle valve unit.

Further advantages accomplished through the present invention reside in particular in that the transmission, the stationary, and the mobile unit may be contained together in a housing cap element. This makes it possible to pre-assemble and manufacture this component independently from the location of the manufacturer of the throttle valve unit. The fully-equipped cap housing element may be easily adapted and coupled to a wide variety of different throttle valve units. Another rather significant advantage is that the mobile unit may be retained in the toothed wheel segment of the transmission. This saves space and simplifies the adjustment of the mobile unit. The ring magnet that is configured in the shape of a partial ring may be easily retained in the toothed wheel segment, and a positive interaction between these ring magnets and partial stator ring segments is guaranteed. The toothed wheel segment, which can be used instead of a fully circular toothed wheel, secures the firm position and the function of the sensor.

The partial stator ring segments and the partially ring-shaped ring magnets may be partially arranged side-by-side in the same plane. The ring magnet segment moves like a sickle into the air gap opening between the two partial stator ring segments, and at the same time at least one Hall-IC probe is positioned in the stator distancing gap.

The partial stator ring segments and the ring magnet segment may also be arranged to be positioned one on top of the other. In this configuration, the ring magnet segment moves within the air gap opening between the two partial stator ring segments. One of the two partial stator ring segments is subdivided into two subdivisions, leaving the distancing gap open between them in which at least one Hall-IC probe is positioned. In the stator distancing gap one, two, or more Hall-IC probes may be positioned. Providing several Hall-IC probes, on the one hand, increases functional reliability through redundant systems, and on the other hand, potential gradients of the Hall-IC probes that are offset from each other by a certain angle may be registered and displayed.

The toothed wheel segment may be made from plastic material into which the ring magnet may be molded. The cap housing element may also be made from plastic material into which the partial stator ring segments or the subdivided partial stator ring segments may be at least partially molded. This secures the structural integration of these parts that are very important for the function and measuring precision of the angular rotation sensor. In this manner, production effort is reduced to a minimum. These elements may be precisely adjusted, making subsequent adjustments superfluous.

The toothed wheel segment may be connected inside the cap housing element by a spring element that is also contained in the cap housing element. This guarantees that when the drive unit is switched off or if the throttle valve shaft does not move, the sensor is moved to a well-defined end position.

The connection between the housing cap element and the throttle valve housing may be accomplished in at least two ways, although other ways will be apparent to those having skill in the art with the benefit of the present disclosure. In one embodiment, the housing cap element may be put on top of the throttle valve housing, thus forming a complete housing. When putting the cap down simultaneously, the toothed wheel segment is plugged onto the throttle valve shaft. The completely equipped, readily supplied housing cap element thus requires only one assembly manipulation in order to attach it to the throttle valve unit, producing in this manner a functional whole. In another embodiment variant, the housing cap element encloses all functional units, i.e., the transmission, the partial stator ring segments, the subdivided partial stator ring segments (if these are used), one or several Hall-IC probes, and the ring-segment-shaped ring magnet. This housing cap element is coupled to the throttle valve housing by a bracket or other device, so both parts form a unit.

The transmission may be realized as a conventional transmission or as a planetary gear. In one embodiment, the transmission includes a the toothed wheel segment, a motor sprocket wheel that is coupled with the drive unit, an intermediate sprocket wheel, and an adjusting sprocket wheel coupled to the intermediate sprocket wheel that can be rotatably retained in the cap housing element, with the toothed wheel segment engaging the adjusting sprocket wheel, and with the motor sprocket wheel engaging the intermediate sprocket wheel.

In one embodiment, the drive unit may be a motor that is at least partially enclosed by the cap housing element. However, it is also possible to couple the motor, which is enclosed in an external housing, with the cap housing element. In both cases, a structural unit results that can be connected in a simple way with a separately manufactured throttle valve unit.

BRIEF DESCRIPTION OF THE DRAWINGS

The following drawings form part of the present specification and are included to further demonstrate certain aspects of the present invention. The invention may be better understood by reference to one or more of these drawings in combination with the detailed description of specific embodiments presented herein. In the figures below, like reference numerals have been applied to like elements. However, the use of different reference numerals should not be interpreted as necessarily implying dissimilar elements.

FIG. 1b shows a detailed view of an angular rotation sensor device according to FIG. 1a.

FIG. 2b shows a detailed view of an angular rotation sensor device according to FIG. 2a.

DESCRIPTION OF ILLUSTRATIVE EMBODIMENTS

Figure 1B:
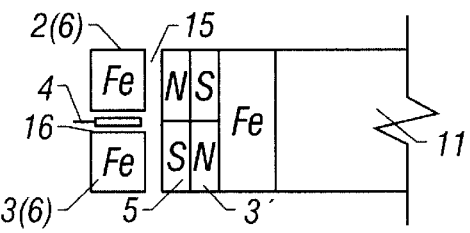
Figure 1A:
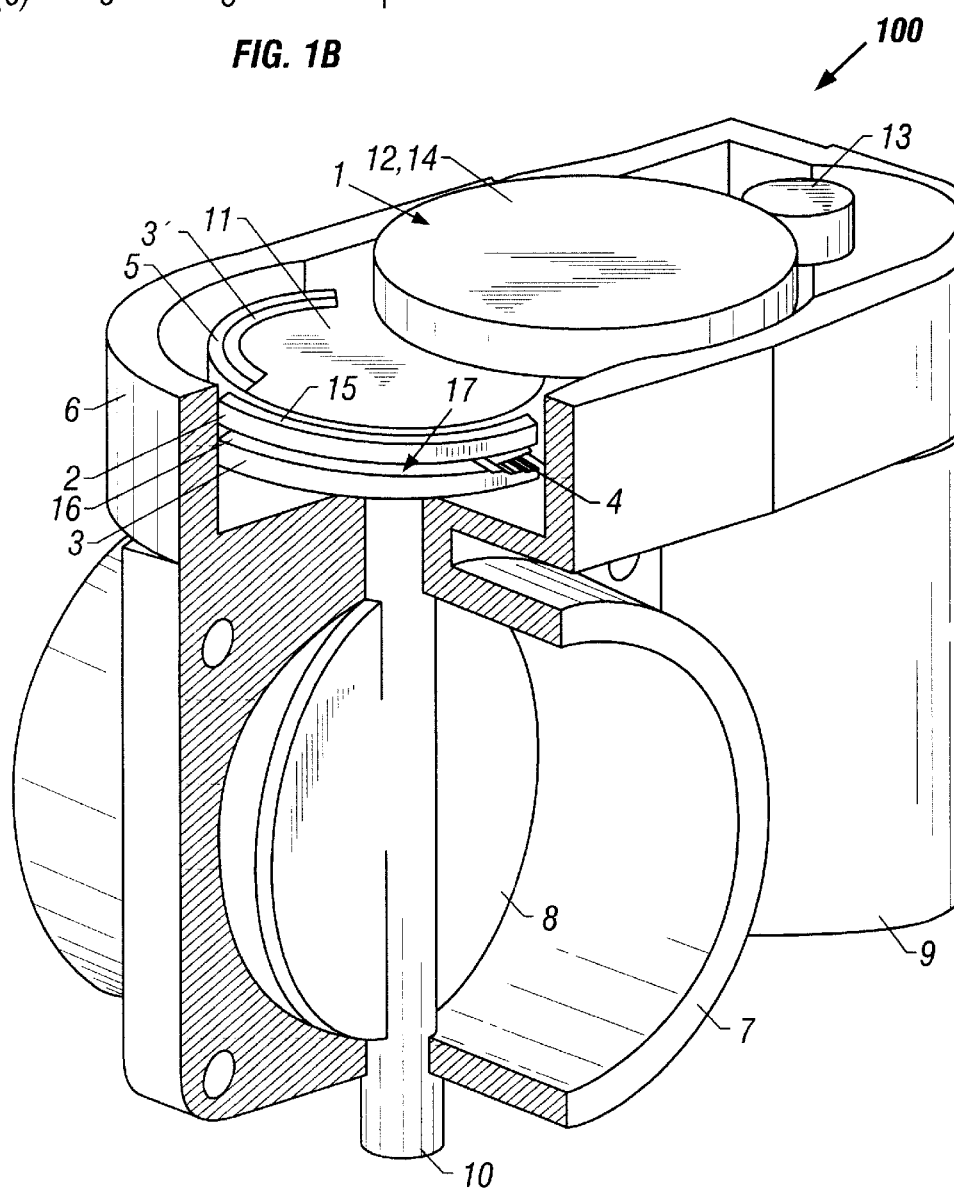
FIG. 1a shows a first embodiment of an angular rotation sensor device with an open sensor housing element coupled to a throttle valve unit in a schematic perspective view.

In FIG. 1a, a throttle valve angular rotation sensor is shown with an angular rotation sensor device 100. It includes an angular rotation sensor device and a throttle valve unit including a throttle valve housing 7 and a throttle valve 8 that is retained in the throttle valve housing 7 and can be adjusted via a throttle valve shaft 10. A sensor housing element 6, which carries a motor 9, is arranged on the throttle valve housing 7. The sensor housing element 6 may, in one embodiment, be manufactured as an enclosed component but it will be understood that it may be manufactured in many different manners. For instance, in another embodiment, it may be manufactured as an open component, as shown in FIG. 1a, that may be subsequently closed with a separate cap.

The sensor housing element 6 contains a transmission 1, a stationary unit 2, 3, 4, and a rotating unit 3', 5 of an angular rotation sensor. The transmission 1 may be configured as a conventional transmission or as a planetary gear. It includes a motor bevel gear 13 that is coupled to a shaft of the motor 9. The motor bevel gear 13 engages the intermediate bevel gear 12, below which an adjusting bevel gear 14 is positioned. The adjusting bevel gear 14 engages a toothed gear segment 11 that is coupled to the throttle valve shaft. The toothed gear segment may be configured as a circular disc that features toothing 17 (See FIG. 2a for a better view) in one segment.

The configuration of the stationary and the moving units is important. As shown in FIG. 1b in particular, the stator unit is formed by two opposing partial ring stator segments 2 and 3. The partial ring stator segments 2 and 3 are retained in a sensor housing element 6. Between the two partial ring stator segments 2 and 3, there is a distancing gap 16 at the end of which, as FIG. 1a shows, there is a Hall-effect IC switch (ASIC) 4.

The partial toothing 17 of toothed gear segment 11 engages the adjusting bevel gear 14. The toothed gear segment 11 is coupled to a spring that is retained in the sensor housing element 6. This guarantees that the toothed gear segment 11 always rotates to a defined end position. By rotating the toothed gear segment 11 to the given end position, it is guaranteed that the angular rotation sensor device 100 also assumes a defined end position.

A partial ring magnet segment 5, and behind it a partial ring stator segment 3', are molded into the toothed gear segment 11 in an appropriate and precise position. The partial ring magnet segment 5 and the partial ring stator segment 3' may be shaped as one piece out of a ferrous material. The section containing the partial ring magnet segment 5 is then formed by means of a magnetizing process as is known in the art. The partial ring magnet segment 5 may be magnetized with opposite polarity. In this manner, the total height of construction of the angular rotation sensor device may be reduced by approximately half. The toothed gear segment 11 itself may be made from plastic material so that both segments 3' and 5' may be molded with great precision and in the exact position.

The two partial ring stator segments 2 and 3, and the partial ring stator segment 3' and the partial ring magnet segment 5, are configured as segments of a circle. In one embodiment, the segment of a circle has an angle that may be between about 80° and about 180° although other ranges of angles may be suitable as well. As a result of tests, it has been established that a greater than about a quarter circle segment of about 115° produces the most accurate measuring results. This produces two opposing, sickle-shaped configurations.

When rotating the toothed gear segment 11, the sickle-shaped configuration formed by the two partial ring stator segments 2 and 3, beginning with the tip of its sickle, and the sickle-shaped configuration formed by the partial ring magnet segment 5 and the third partial ring stator segment 3', move past each other leaving an air gap 15 between them. The zero position of the toothed gear segment 11 is shown in FIG. 1a. In this position, the tips of the two sickles 2 and 3, and 3' and 5, overlap each other only minimally. When the toothed gear segment rotates into its end position, the two partial ring stator segments 2 and 3 rotate enough to assume an almost completely overlapping position with the partial ring magnet segment 5 and the partial ring stator segment 3' located behind it. The Hall-effect IC switch (ASIC) 4 is positioned at the end of the movement, as FIG. 1a illustrates. Rotating the two sickle-shaped units against each other from the zero position to the end position generates a variable Hall voltage that corresponds to the various angle positions.

Figure 2B:
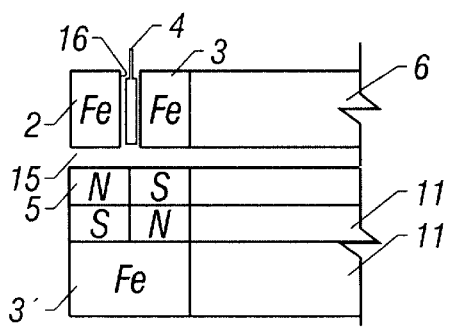
Figure 2A:
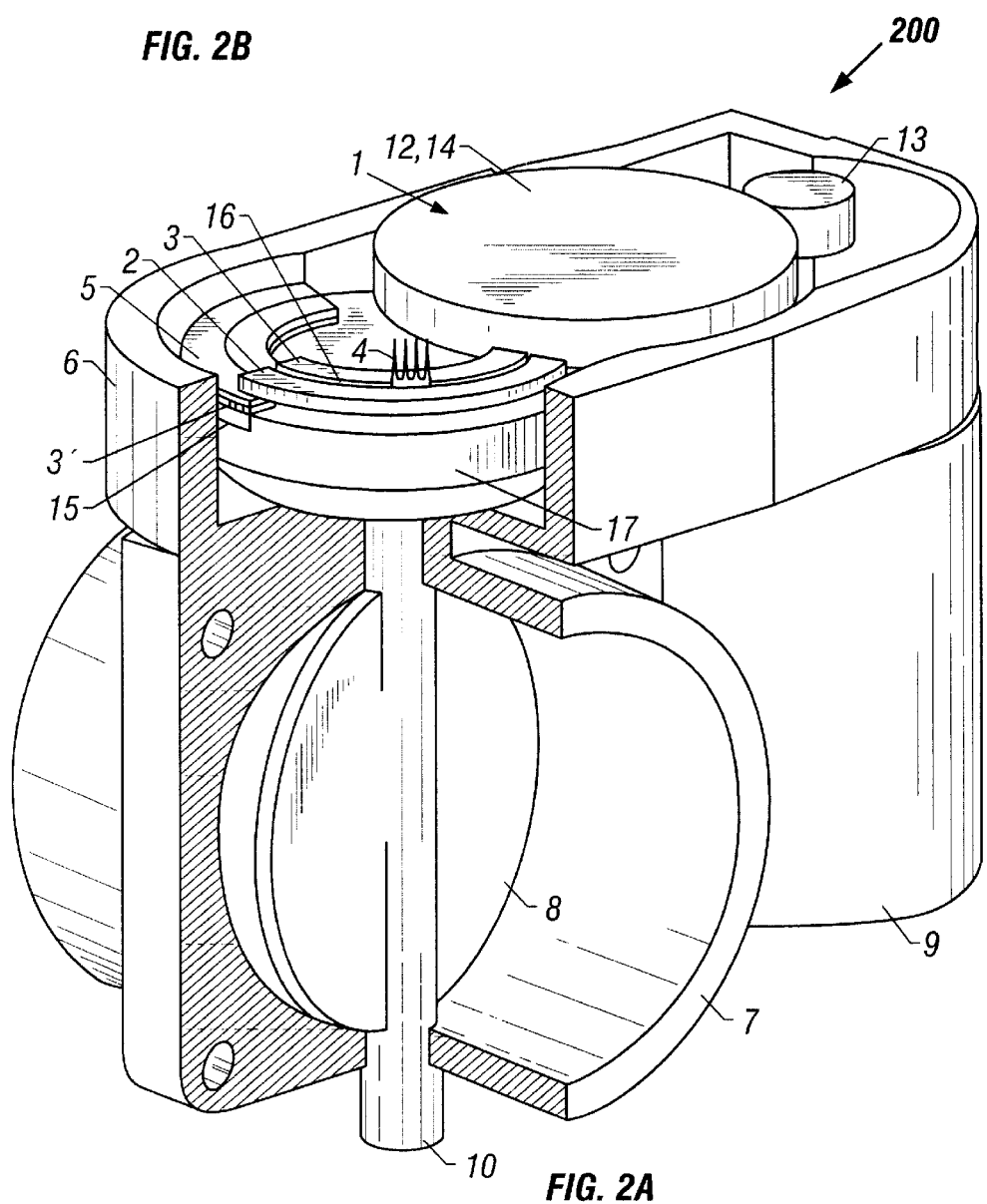
FIG. 2a shows a second embodiment of an angular rotation sensor device with an open sensor housing element connected to a throttle valve unit in a schematic perspective view.

In an angular rotation sensor device shown in FIGS. 2a and 2b, the transmission 1 and also the toothed gear segment 11 of the transmission are configured in a way similar to that in FIG. 1a. Also, the toothed gear segment is coupled to the sensor housing element with a spring that also guarantees a defined end position.

The difference between the angular rotation sensor device 200 and the angular rotation sensor device 100 is clarified by FIG. 2b. Here, it becomes clear that the individual segments 2, 3, 3', 4 and 5 are positioned in a vertical arrangement, one above the other.

In one embodiment, the partial ring stator segment 2 and the partial ring stator segment 3 are at least partially molded into the sensor housing element 6. Between them, there is the stator distancing gap 16, in which the Hall-effect IC switch (ASIC) 4 is positioned. As in device 100, not only one, but two Hall-effect IC switches 4 may be positioned in the stator distancing gap 16. This makes it possible to measure two angularly-offset voltages. The second probe 4, however, may also be installed for reasons of redundancy, thus significantly increasing reliability and measuring precision. If the sensor housing element 6 features a separate cap, the two partial ring stator segments 2 and 3 may be molded into this cap.

The partial ring stator segment 3', and above it the partial ring magnet segment 5, may be molded into the toothed gear segment 11 and retained in this manner. There is an air gap 15 between the partial ring stator segment 5 and the two partial ring stator segments 2 and 3. Here too, the two partial ring stator segments 2, 3, and 3' may be made out of ferrous material, which has been labeled with the designation Fe, the symbol for iron. The partial ring stator segment 3' and the partial ring magnet segment 5 may be molded as one piece, as is also the case in the angular rotation sensor device 100. The partial ring magnet segment 5 may be magnetized with opposite polarity, which has the positive effect of reducing the entire height by approximately half.

FIG. 2a shows that here too, two sickle-shaped configurations are generated that move more than a quarter of a circle with a length that can be between about 80° and about 180° (or other ranges) but is here advantageously about 115°.

When these two sickle-shaped formations are rotated, the tip of the sickle formed by the ring magnet segment 5 and the partial ring stator segment 3' rotates underneath the sickle formed by the two partial ring stator segments 2 and 3. When the toothed gear segment rotates from a zero position to an end position, the two sickles 3' and 5, and 2 and 3, are at least partially opposite (i.e. their tips overlap somewhat) allowing the measurement of a starting value. When the toothed gear segment 11 rotates into its end position, the lower sickle formed by the partial ring stator segment 3' and the partial ring magnet segment 5 is positioned completely underneath the other sickle (i.e. almost completely overlapping).

The motor 9 may either be enclosed in the sensor housing element 6 or it may be coupled to it separately. The sensor housing element 6 that contains either the angular rotation sensor device 100 or the angular rotation sensor device 200 may be formed in the following way: the sensor housing element may be a complete housing that is closed separately with a cap. This housing may be attached directly to the throttle valve housing 7, as shown in FIGS. 1a and 2a. The sensor housing element 6 configured in this way, however, may also be coupled to the throttle valve housing 7 by means of connecting elements. When setting it on the throttle valve housing in this manner, the toothed gear segment 11 may be plugged onto the throttle valve shaft 10.

In another embodiment, the sensor housing element may be configured like a cap that can close the throttle valve housing 7. In such an embodiment, the toothed gear segment may be plugged onto the throttle valve shaft 10.

The two embodiments mentioned above have the advantage that the angular rotation sensor devices 100 or 200 (with and without accessories such as a transmission, a motor unit, etc.) may be assembled at a site that is different from the site where the throttle valve unit with the throttle valve housing 7 and the throttle valve 8, which is held rotatably by the throttle valve shaft 10 in the housing 7, is assembled. In addition, another important advantage is that the total height of the angular rotation sensor device may be reduced by nearly half due to its configuration. In this manner, the space that is available in a motor compartment may be optimized. Molding the essential parts of the angular rotation sensor device into the sensor housing element 6 or into the toothed gear segment 11 reduces the assembly effort and the assembly time in comparison to conventional devices.

Figure 3:
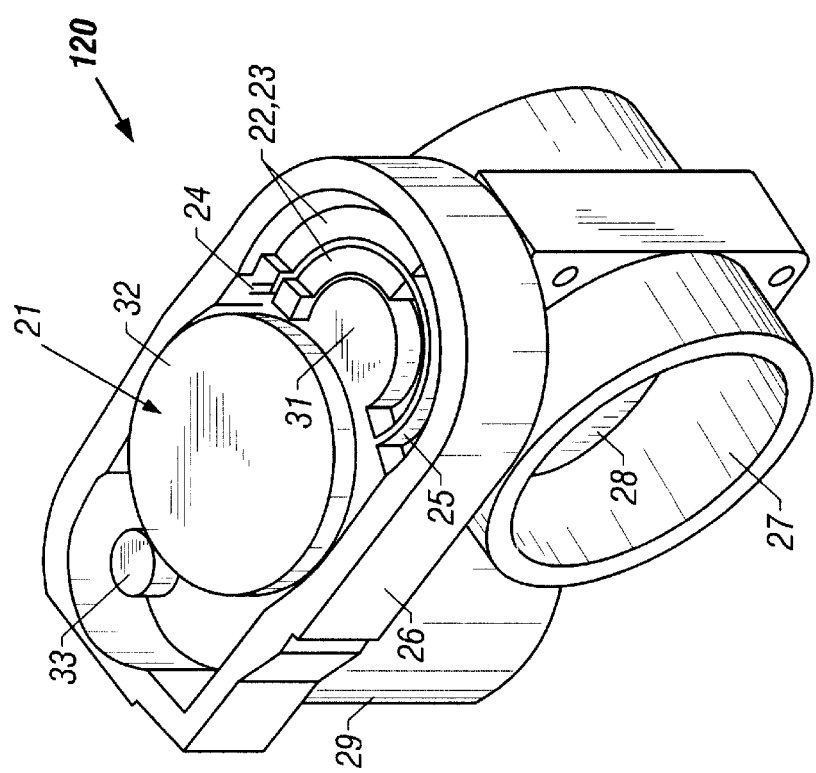
FIG. 3 shows a first embodiment of a throttle valve angular rotation sensor that is firmly coupled to a throttle valve unit with an open cap housing element in a schematic perspective view.
Figure 5:
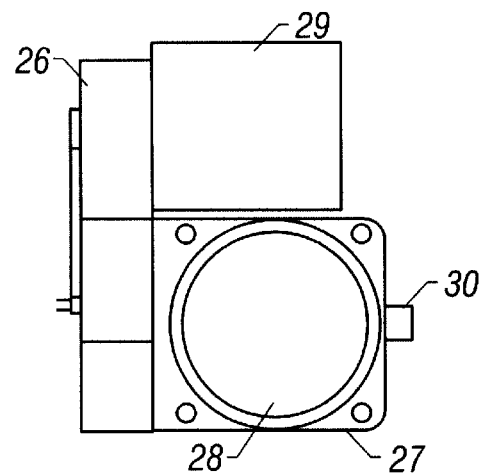
FIG. 5 shows a throttle valve angular rotation sensor according to FIG. 3 in a schematic side view.
Figure 6:
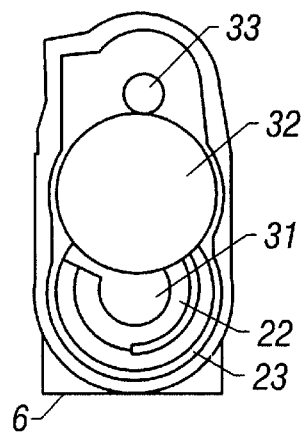
FIG. 6 shows a throttle valve angular rotation sensor according to FIG. 3 in a schematic bird's eye view.
Figure 7:
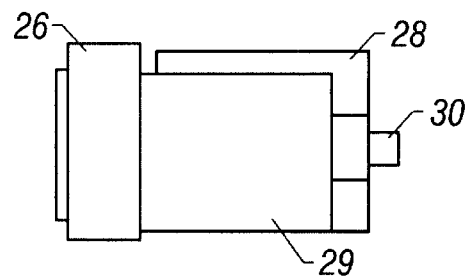
FIG. 7 shows a throttle valve angular rotation sensor according to FIG. 3 in a schematic rear view.

In FIG. 3, a throttle valve angular rotation sensor 120 is shown. It includes a throttle valve unit including a throttle valve housing 27 and a throttle valve 28 that is adjustably retained via a throttle valve shaft 30 in a throttle valve housing 27.

As FIGS. 3–7 show, a cap housing element 26 carrying a motor 29 is positioned on top of the throttle valve housing 27. The cap housing element 26 may be manufactured as a closed component. It can also be manufactured in an open configuration that is then closed by a separate cap. In the cap housing element are contained a transmission 21, a stationary unit 22, 23, 24 and a rotating unit 25.

The transmission 21 may be configured as a conventional transmission or as a planetary gear. It includes a motor sprocket wheel 33 that is coupled to the shaft of the motor 29. The motor sprocket wheel operates in conjunction with an intermediate sprocket wheel 32 to the bottom side (see also FIG. 8) of which an adjusting sprocket wheel 34 is positioned. The adjusting sprocket wheel 34, on its part, operates in conjunction with a toothed wheel segment 31 that is coupled with the throttle valve shaft.

Figure 8:
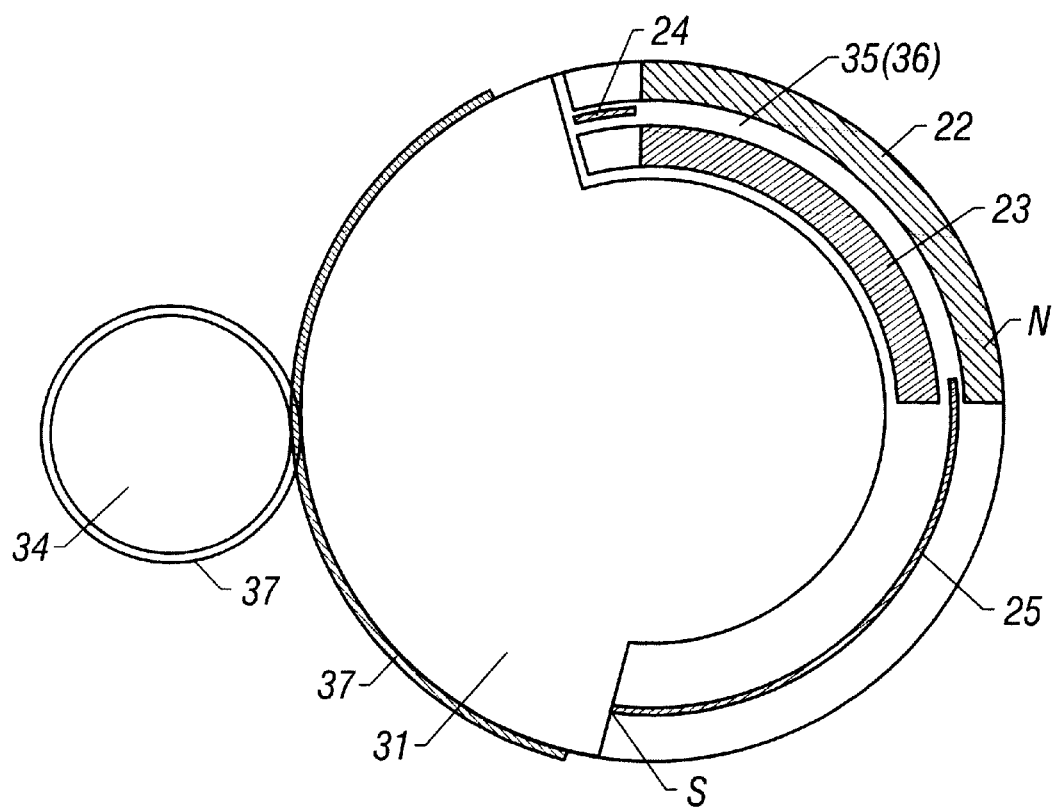
FIG. 8 shows an enlarged detail of a throttle valve angular rotation sensor according to FIGS. 3 and 5–7 in a schematic bird's eye view.

The configuration of the stationary and the mobile units is very important. As FIG. 8 shows, the stationary unit is formed by two partial stator ring segments 22 and 23 that are positioned opposite from each other. The partial stator ring segments 22 and 23 are retained in the housing element 26. An air gap 35 exists between the two partial stator ring segments 22 and 23 that is simultaneously a stator distancing gap and at the end of which a Hall-IC probe (ASIC) 24 is positioned.

The toothed wheel segment 31 engages the adjusting sprocket wheel 34 over approximately one third of its circumference with both toothed wheels having toothing 37. The toothed wheel segment 31 is coupled by a spring that is retained in the cap housing element 26. This guarantees that the toothed wheel segment 31 is always rotated into a defined end position. When rotating the toothed wheel segment 31 into the end position, it is made sure that the throttle valve angular rotation sensor 120 also assumes a defined end position.

Opposite from the toothed segment of the toothed wheel segment 31, another circular segment is positioned that maintains a distance to the partial stator ring segment 23. Into one side of this segment, a ring magnet 25 is molded that is configured in the shape of a segment of a circle. Since the toothed wheel segment 31 may be made out of plastic material, the ring magnet 25, that is configured in the shape of a segment of a circle, may be molded in precisely the correct position. When the toothed wheel segment 31 rotates the ring magnet, configured in the shape of a half circle, it moves like a sickle into the gap marked with designations 35 and 36, and in this manner generates a variable Hall voltage.

Figure 4:
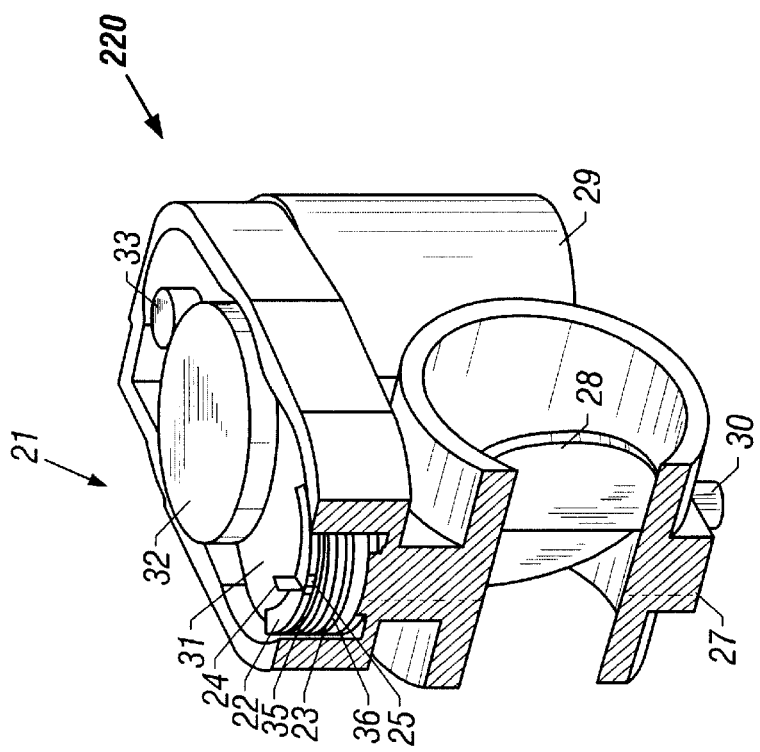
FIG. 4 shows a second embodiment of a throttle valve angular rotation sensor that is coupled with a throttle valve unit with an open cap housing element in a schematic perspective view.

In a throttle valve angular rotation sensor 220, shown in FIG. 4, the transmission 21 and also the toothed wheel segment 31 of the transmission are configured as shown in FIG. 3. However, here the partial stator ring segments 22 and 23, and the ring magnet 25, are not positioned in the same plane, but vertically on top of each other. Specifically, the partial stator ring segment 22 is subdivided into two sub-partial stator ring segments 22.1 and 22.2 (not shown). Between the two sub-partial stator ring segments 22.1 and 22.2, the stator distancing gap 36 opens up into which the Hall-IC probe (ASIC) 24 is inserted. It is also possible to create two gaps 36 by further subdividing the partial stator ring segment 22, and in this manner to be in a position to register two output potential gradients of the Hall-IC probe that are offset by a certain angle.

An air gap 35 opens between the two sub-partial stator ring segments 22.1 and 22.2 and the partial stator ring segment 23, positioned below them. The ring magnet 25 moves in this air gap and is retained by the toothed wheel segment 27. By molding the ring magnet 25 into the toothed wheel segment 31 that is made out of plastic material, and by molding the sub-partial stator ring segments 22.1 and 22.2 and the partial stator ring segment 23 into the cap housing element 6 that is also molded from plastic material, the precise adjustment of the parts of the sensor that are important for the exactness of measurements may be secured.

The cap housing element 26 may be configured like the housing cap that contains the described parts of the sensor 120 or 220. In addition, the cap housing element 26 may also contain the motor 29. However, it is also possible to enclose the motor 29 in a separate housing which is then flanged to the throttle valve housing 27. A throttle valve angular rotation sensor 120 or 220 with such a throttle valve housing 27 may be manufactured in a location that is different from that where the throttle valve unit is manufactured, and can be subsequently put on the throttle valve unit. When putting the cap housing element 26 on the throttle valve housing 27 simultaneously, the throttle valve shaft engages the toothed wheel segment 31 or a clutch unit, permitting the sensor to be combined with the throttle valve in a single manipulation.

In other embodiments, it is possible to manufacture the cap housing element 26 as a flat cylindrical box that may be closed with a separate cap, as shown in FIGS. 3 and 4, and that also contains the described elements of the throttle valve angular rotation sensor 120 or 220. In this case, it is possible to connect the cap with the throttle valve housing by plugging one onto the other while at the same time engaging the throttle valve shaft of the throttle valve. But it is also possible to prefabricate the throttle valve housing and the cap housing element as a unit and subsequently equip them as required.

All of the methods and apparatus disclosed and claimed herein can be made and executed without undue experimentation in light of the present disclosure. While the techniques of this invention have been described in terms of specific embodiments, it will be apparent to those of skill in the art that variations may be applied to the techniques described herein without departing from the concept, spirit and scope of the invention. All such modifications apparent to those skilled in the art are deemed to be within the spirit, scope and concept of the invention as defined by the appended claims.

What is claimed is:

1. An adjusting device for a throttle valve unit, comprising:
    a throttle valve;
    a throttle valve shaft;
    a throttle valve housing; and
    a Hall-effect angular rotation sensor device coupled with the throttle valve shaft, the Hall-effect angular rotation sensor device comprising:
      a stationary unit;
      a mobile unit moveable in relation to the stationary unit;
      a drive unit;
      a transmission positioned between the mobile unit and the drive unit; and
      a housing element that at least partially encloses the stationary unit, the mobile unit, and the transmission;
    wherein the transmission, the stationary unit, and the mobile unit are contained in a cap housing element;
    wherein the stationary unit includes at least two partial stator ring segments positioned at a distance from each other to leave an air gap and at least one stator distancing gap between them; and
    wherein the mobile unit includes a ring magnet contained in a toothed wheel segment of the transmission, the ring magnet being configured to move at least partially in the air gap.

2. The device of claim 1, wherein the partial stator ring segments and the ring magnet are positioned in the same plane at least partially side-by-side.

3. The device of claim 1, wherein the partial stator ring segments and the ring magnet are positioned vertically one on top of the other.

4. The device of claim 1, wherein the stator distancing gap and the air gap are integral.

5. The device of claim 1, wherein the toothed wheel segment is constructed from plastic material into which the ring magnet is at least partially molded.

6. The device of claim 1, wherein the cap housing element is constructed from plastic material into which the partial stator ring segments are at least partially molded.

7. The device of claim 1, wherein the toothed wheel segment is coupled to a spring element.

8. The device of claim 1, wherein the cap housing element is configured to be plugged onto the throttle valve housing, and wherein the toothed wheel segment is configured to engage the throttle valve shaft.

9. The device of claim 1, wherein the transmission comprises:

a toothed wheel segment;
a motor sprocket wheel coupled with the drive unit;
an intermediate sprocket wheel; and
an adjusting sprocket wheel coupled to the intermediate sprocket wheel.

10. The device of claim 1, wherein the drive unit comprises a motor that is at least partially enclosed by the cap housing element.

* * * * *